(12) United States Patent
Schwantes

(10) Patent No.: US 6,592,990 B2
(45) Date of Patent: Jul. 15, 2003

(54) IN SITU MICROENCAPSULATED ADHESIVE

(75) Inventor: Todd Arlin Schwantes, Lena, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 09/942,648

(22) Filed: Aug. 30, 2001

(65) Prior Publication Data

US 2002/0169233 A1 Nov. 14, 2002

Related U.S. Application Data

(60) Provisional application No. 60/230,365, filed on Sep. 6, 2000.

(51) Int. Cl.$^7$ .................... B32B 15/02; B32B 27/00; B01J 13/02
(52) U.S. Cl. .................... 428/402.21; 264/4.1; 264/4.3; 264/4.33; 264/4.6; 264/4.7; 428/402.22; 428/500; 430/109; 430/110; 522/13
(58) Field of Search .................... 264/4.1, 4.3, 4.33, 264/4.6, 4.7; 428/402.21, 402.22, 500; 430/109, 110; 522/13

(56) References Cited

U.S. PATENT DOCUMENTS

| | | | | |
|---|---|---|---|---|
| 2,907,682 A | 10/1959 | Eichel | .................... | 117/122 |
| 2,986,477 A | 5/1961 | Eichel | .................... | 117/122 |
| 2,988,461 A | 6/1961 | Eichel | .................... | 117/122 |
| 3,080,250 A | 5/1963 | Claus | .................... | 117/17.5 |
| 3,429,827 A | 2/1969 | Ruus | .................... | 252/316 |
| 3,516,941 A | 6/1970 | Matson | .................... | 252/316 |
| 3,663,269 A | 5/1972 | Fischer et al. | .................... | 117/76 |
| 3,691,140 A | 9/1972 | Silver | .................... | 260/78.5 |
| 3,718,495 A | 2/1973 | Tomita | .................... | 117/7 |
| 3,725,501 A | 4/1973 | Hilbelink et al. | .................... | 260/284 R |
| 3,814,156 A | 6/1974 | Bachmann et al. | .................... | 151/14.5 |
| 3,825,640 A | 7/1974 | Maierson | .................... | 264/87 |
| 3,826,580 A | 7/1974 | Bohli | .................... | 401/132 |
| 3,844,816 A | 10/1974 | Vassiliades et al. | .................... | 117/36.2 |
| 3,866,873 A | 2/1975 | Bohli | .................... | 248/205 A |
| 3,886,085 A | 5/1975 | Kiritani et al. | .................... | 252/316 |
| 3,893,932 A | 7/1975 | Azar et al. | .................... | 252/62.1 |
| 3,965,033 A | 6/1976 | Matsukawa et al. | .................... | 252/316 |
| 3,996,308 A | 12/1976 | Douek et al. | .................... | 260/859 R |
| 4,001,140 A | * 1/1977 | Foris et al. | .................... | 264/4.7 |
| 4,061,826 A | 12/1977 | Petras et al. | .................... | 428/356 |
| 4,077,926 A | 3/1978 | Sanderson et al. | .................... | 260/29.6 |
| 4,087,376 A | * 5/1978 | Foris et al. | .................... | 264/4.7 |
| 4,089,802 A | 5/1978 | Foris et al. | .................... | 252/316 |
| 4,094,222 A | 6/1978 | Lang et al. | .................... | 85/63 |
| 4,100,103 A | 7/1978 | Foris et al. | .................... | 252/316 |
| 4,100,954 A | 7/1978 | Muller et al. | .................... | 151/41.7 |
| 4,115,474 A | 9/1978 | Vassiliades et al. | .................... | 260/855 |
| 4,126,504 A | 11/1978 | Wolinski et al. | .................... | 156/310 |
| 4,166,152 A | 8/1979 | Baker et al. | .................... | 428/522 |
| 4,186,743 A | 2/1980 | Steiger | .................... | 128/284 |
| 4,221,710 A | * 9/1980 | Hoshi et al. | .................... | 264/4.7 |
| 4,252,708 A | 2/1981 | Newell | .................... | 260/31.8 E |
| 4,273,827 A | 6/1981 | Sweeney et al. | .................... | 428/307 |
| 4,285,720 A | 8/1981 | Scher | .................... | 71/88 |
| 4,307,206 A | 12/1981 | Higuchi et al. | .................... | 525/4 |
| 4,362,566 A | 12/1982 | Hinterwaldner | .................... | 106/85 |
| 4,444,699 A | 4/1984 | Hayford | .................... | 264/4.7 |
| 4,520,091 A | 5/1985 | Kakimi et al. | .................... | 430/110 |
| 4,552,811 A | 11/1985 | Brown et al. | .................... | 428/402.21 |
| 4,555,206 A | 11/1985 | Sweeney | .................... | 411/23 |
| 4,601,863 A | 7/1986 | Shioi et la. | .................... | 264/4.3 |
| 4,610,927 A | 9/1986 | Igarashi et al. | .................... | 428/402.21 |
| 4,622,267 A | 11/1986 | Riecke | .................... | 428/402.21 |
| 4,708,924 A | 11/1987 | Nagai et al. | .................... | 430/138 |
| 4,721,748 A | 1/1988 | Iovine et al. | .................... | 524/460 |
| 4,768,523 A | 9/1988 | Cahalan et al. | .................... | 128/785 |
| 4,808,639 A | 2/1989 | Chernack | .................... | 523/211 |
| 4,879,178 A | 11/1989 | Sun et al. | .................... | 428/355 |
| 4,886,579 A | 12/1989 | Clark et al. | .................... | 162/111 |
| 4,908,268 A | 3/1990 | Mudge | .................... | 428/343 |
| 4,940,852 A | 7/1990 | Chernack | .................... | 523/211 |
| 4,975,484 A | 12/1990 | Fryd et al. | .................... | 524/811 |
| 4,980,410 A | 12/1990 | Fryd et al. | .................... | 524/510 |
| 5,006,582 A | 4/1991 | Mancinelli | .................... | 524/271 |
| 5,049,608 A | 9/1991 | Medina | .................... | 524/375 |
| 5,120,349 A | 6/1992 | Stewart et al. | .................... | 71/93 |
| 5,140,068 A | 8/1992 | Siebert et al. | .................... | 525/108 |
| 5,157,077 A | 10/1992 | Siebert et al. | .................... | 525/108 |
| 5,206,288 A | 4/1993 | Gosiewski et al. | .................... | 525/83 |

(List continued on next page.)

OTHER PUBLICATIONS

Capsules Capture New Markets, Chemical Week, Dec. 21, 1963.
Consumer Bulletin Article Aug., 1959.
NCR Encapsulation.
Versatile Capsules, Wall Street Journal, Sep. 15, 1965.
Capsular Adhesives, Tappi, May 1966.
Microencapsulation, Encyclopedia of Chemical Technology, 1967.

*Primary Examiner*—Samuel A. Acquah
(74) *Attorney, Agent, or Firm*—Benjamin Mieliulis

(57) ABSTRACT

A novel adhesive formed in situ in a microcapsule and method for forming such a pressure sensitive or flowable adhesive in situ in a microcapsule is disclosed. The method for forming the novel adhesive comprises providing an aqueous mixture of wall material in water; adding a substantially water insoluble core material, free radical initiator, and a solvent for the pre-polymers to the aqueous mixture. The core material comprises a first addition polymerizable pre-polymer having a Tg of less than about 0° C., a flash point of at least 75° C., and a boiling point of at least 175° C. These are typically selected from acrylate or methacrylate type materials. Optionally included is a second addition polymerizable pre-polymer for providing cross-linking or interaction between polymer chains. High shear agitation is provided to the aqueous mixture to achieve a particle size of about 0.1 to 250 microns. Stirring at a first temperature effects capsule wall formation; and heating to a second temperature polymerizes the pre-polymers of the core material to form an adhesive in situ in the formed capsules.

8 Claims, No Drawings

U.S. PATENT DOCUMENTS

| | | | |
|---|---|---|---|
| 5,223,371 A | 6/1993 | Ohta | 430/138 |
| 5,225,470 A | 7/1993 | Mancinelli | 524/271 |
| 5,242,980 A | 9/1993 | Tse | 525/114 |
| 5,292,835 A | 3/1994 | Jahns et al. | 526/73 |
| 5,407,609 A | 4/1995 | Tice et al. | 264/46 |
| 5,439,960 A | 8/1995 | Mudge et al. | 524/111 |
| 5,510,431 A | 4/1996 | Earls et al. | 525/481 |
| 5,536,612 A | 7/1996 | Yamaguchi et al. | 430/137 |
| 5,596,051 A | 1/1997 | Jahns et al. | 526/73 |
| 5,612,136 A | 3/1997 | Everaerts et al. | 428/355 AK |
| 5,688,850 A | 11/1997 | Wyffels | 524/317 |
| 5,783,209 A | 7/1998 | Imamura et al. | 424/448 |
| 5,814,685 A | 9/1998 | Satake et al. | 523/201 |
| 5,827,913 A | 10/1998 | Baetzold et al. | 523/210 |
| 5,882,755 A | 3/1999 | Igarashi et al. | 428/41.8 |
| 5,905,099 A | 5/1999 | Everaerts et al. | 522/126 |
| 5,922,798 A | 7/1999 | Roesch et al. | 524/360 |
| 6,057,384 A | 5/2000 | Nguyen et al. | 523/160 |
| 6,084,010 A | 7/2000 | Baetzold et al. | 523/210 |
| 6,126,872 A | 10/2000 | Kommareddi et al. | 264/4.1 |
| 6,375,872 B1 | 4/2002 | Chao | 264/4.33 |

\* cited by examiner

IN SITU MICROENCAPSULATED ADHESIVE

This application under 35 USC §111 (a) claims benefit per 35 USC §119(e) of U.S. Serial No. 60/230,365 filed Sep. 6, 2000.

BACKGROUND OF THE INVENTION

1. Field of the Invention

This invention relates to cross-linkable adhesive. It more particularly relates to microencapsulated adhesives and products containing such microencapsulated adhesive.

2. Description of Related Art

Microencapsulated adhesives are known in the art and are often conveniently classified based upon mode of activation, extent of component microencapsulation, adhesive chemistry, or suitability for various surfaces.

Microencapsulated adhesives can involve solvent-based systems or reactive and curable resin systems. Solvent-based systems rely on adhesive reactivation through solvent delivery. Sometimes microcapsules are used as the vehicle to retain the solvent until needed. Other activatable systems rely on the plasticizer or UV initiator being encapsulated in place of solvent in order to tackify the resin at the time of use.

Capsules containing a solvent for the adhesive are typically dispersed throughout a nontacky adhesive coating on a substrate. Upon rupture of the capsules, a solvent is released making the adhesive tacky. A plasticizer can similarly be encapsulated and used in place of or in conjunction with a solvent to tackify the adhesive. Solvent systems relying primarily on organic solvents are increasingly disfavored for environmental considerations.

Reactive resin systems typically involve an encapsulated curing system. Either the total formulation or one component can be encapsulated. The reactive components however must be isolated or kept separate until use. Typically two separate encapsulations are required. Reactive systems typically employ epoxy resins, isocyanates, polyesters and the like.

Another form of encapsulated adhesive is the self-contained capsule. Typically the curing agent is adhered to the capsule surface. Upon rupture of the capsule wall, the resin flows to contact the curing agent. Curing agents can include boron trifluouride complexes, nitrile or aniline type calatysts, acid chlorides, hexamethylenetetramine, various oxides, dibutyltin dilaurate and the like.

Capsule release mechanisms can involve pressure, heat or dissolution of the capsule wall. Heat activated systems thermally cure upon heating above the activation temperature.

DETAILED DESCRIPTION.

The present invention provides a novel and improved adhesive comprising an encapsulated adhesive of monomers polymerized in situ within a microcapsule to form the adhesive. More particularly, the present invention provides a microcapsule and process for forming a microcapsule that benefically provides for in situ polymerization within the capsule to form a microencapsulated pressure sensitive or flowable adhesive. The adhesive is formed inside the microcapsule incident to or following capsule formation.

The microencapsulated adhesive comprises a capsule wall material composed of a polymeric composition enclosing an adhesive core material composed of a polymeric composition. The polymeric composition comprising capsule wall material is formed of monomers which polymerize at a lower temperature than monomers which form the polymeric composition of the adhesive core material.

The microencapsulated adhesive can be made pressure sensitive or responsive to other known means of capsule rupture in addition to impact, such as heat, friction, sonic energy or other energy input making the microcapsule permeable or fractured. The adhesive can be pressure sensitive or flowable. Rupture of the capsule by any of the above recited means makes the adhesive available.

Unlike solvent based adhesive reactivation systems, the invention teaches a new adhesive system. The invention is a microcapsule containing adhesive (or microencapsulated adhesive) wherein the adhesive is formed in situ in the microcapsule. The composition comprises a substantially water insoluble adhesive-forming core material. The core material comprises at least a first addition polymerizable pre-polymer material whose homopolymer has a Tg of less than about 0° C. a flash point of at least 75° C., and a boiling point of at least 175° C. A solvent for the adhesive-forming core material is optionally included. The solvent is substantially water insoluble and nonreactive with the pre-polymer material. Rather than adhesive reactivation, the solvent provides a medium for the various pre-polymer materials in which to undergo polymerization and adhesive formation. Useful solvents include petroleum oils, vegetable oils, vegetable oil esters, liquid hydrocarbon resins, liquid plasticizers and blends thereof.

A catalytically effective amount of a substantially water insoluble free radical initiator is also included along with the addition polymerizable pre-polymer and solvent. The free radical initiator is selected to have a half-life of at least 10 hours at 25° C., and more preferably at least 1 hour at 25° C. The free radical initiator needs to be soluble in the polymerizable pre-polymer material and solvent. The free radical initiator can be selected from the group of initiators comprising an azo initiator, peroxide, dialkyl peroxide, alkyl peroxide, peroxyester, peroxycarbonate, peroxyketone and peroxydicarbonate. More particularly the free radical initiator is selected from 2, 2'-azobis (isobutylnitrile), 2,2'-azobis (2,4-dimethylpentanenitrile), 2,2'-azobis (2,4-dimethylvaleronitrile), 2,2'-azobis(2-methylpropanenitrile), 2,2'-azobis (methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl) peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate.

The microcapsules are obtained by providing an aqueous mixture containing 5 a colloidal dispersion of hydrophillic wall-forming material for forming microcapsules.

High shear agitation is applied to the aqueous mixture to achieve a particle size of the core material of about 0.1 to 250 μ (250 microns), preferably 0.1 to 100 microns and more preferably 0.1 to 50 microns. Smaller capsules of 10 μ or less can be produced for specialized applications. Stirring at a first temperature effects microcapsule wall formation of the microcapsule wall-forming material. Heating to a second temperature which could be substantially the same as the first temperature, although usually higher, polymerizes the monomer of the core material to form an adhesive in situ in the formed microcapsules.

With gelatin-based wall-forming materials, the first temperature heating step would entail relatively low temperatures such as 5° C. for the wall forming step and 25° C. or more, more typically 60° C. to 90° C. for the adhesive-forming or adhesive-polymerizing step. With alkyl acrylate acrylic acid copolymer wall materials, the wall forming temperature is typically around 60° C. and the adhesive-forming step at about 90° C. The respective temperatures of the wall-forming step and adhesive-forming step relate to the temperature of polymerization of the selected wall-forming material and adhesive pre-polymers. The first and second temperature can be substantially similar with appropriate materials selection, though this is not preferred. Some temperature separation of at least 2–3 degrees is preferred to minimize adhesive occlusion in the wall material. In addition to stirring at a first temperature, the pH can be lowered with many wall forming materials to help effect microcapsule wall formation.

The invention teaches a new adhesive system and method of making, yielding a pressure sensitive or flowable adhesive in situ in a microcapsule. The microcapsule can be formed from materials comprising gellable colloids, carboxymethyl cellulose, gelatin, gelatin-gum arabic, methylated methylol melamine resin, melamine formaldehyde, dimethylol urea, urea formaldehyde, methylol melamine, methylated dimethyl urea, a gelatin anionic polymer, alkyl acrylate-acrylic acid copolymer or other commonly-used polymeric materials used in coacervation.

Processes of microencapsulation are now well known in the art. U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrenesulfonic acid. Microcapsules are also taught in U.S. Pat. Nos. 2,730,457 and 4,197,346. The more preferred process for forming microcapsules are from urea-formaldehyde resin and/or melamine formaldehyde resin as disclosed in U.S. Pat. Nos. 4,001,140; 4,081,376, 4,089,802; 4,100,103; 4,105,823; 4,444,699 or most preferably alkyl acrylate-acrylic acid copolymer capsules as taught in U.S. Patent No. 4,552,811, each patent described is incorporated herein by reference to the extent each provides guidance regarding microencapsulation processes and materials.

Interfacial polymerization is a process wherein a microcapsule wall of a polyamide, an epoxy resin, a polyurethane, a polyurea or the like is formed at an interface between two phases. U.S. Pat. No. 4,622,267 incorporated herein by reference discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. The microencapsulation processes of U.S. Pat. No. 3,516,941 are also incorporated herein by reference. This patent teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules proceeds via interfacial polymerization.

Common microencapsulation processes can be viewed as a series of steps. First, the core material which is to be encapsulated is emulsified or dispersed in a suitable dispersion medium. This medium is preferably aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Gelatin or gelatin-containing microcapsule wall material is well known. The teachings of the phase separation processes, or coacervation processes which are described in U.S. Pat. Nos. 2,800,457 and 2,800,458 are incorporated herein by reference. Uses of such capsules are described in U.S. Pat. No. 2,730,456.

More recent processes of microencapsulation involve, and preferred herein, are the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, as taught in U.S. Pat. No. 4,552,811 is incorporated by reference. These materials are dispersed in an aqueous vehicle and the reaction is conducted in the presence of acrylic acid-alkyl acrylate copolymers.

Preferably, the wall forming material is free of carboxylic acid anhydride or limited so as not to exceed 0.5 weight percent of the wall material.

A method of encapsulation by a reaction between urea and formaldehyde or polycondensation of monomeric or low molecular weight polymers of dimethylol urea or methylated dimethylol urea in an aqueous vehicle conducted in the presence of negatively-charged, carboxyl-substituted, linear aliphatic hydrocarbon polyelectrolyte material dissolved in the vehicle, as taught in U.S. Pat. Nos. 4,001,140; 4,087,376; and 4,089,802 is incorporated by reference.

A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted linear aliphatic hydrocarbon polyelectrolyte material dissolved in the vehicle, is disclosed in U.S. Pat. No, 4,100,103, is incorporated by reference.

A method of encapsulating by polymerizing urea and formaldehyde in the presence of gum arabic as disclosed in U.S. Pat. No. 4,221,710 is incorporated by reference. This patent further discloses that anionic high molecular weight electrolytes can also be employed with the gum arabic. Examples of the anionic high molecular weight electrolytes include acrylic acid copolymers. Specific examples of acrylic acid copolymers include copolymers of alkyl acrylates and acrylic acid including methyl acrylate-acrylic acid, ethyl acrylate-acrylic acid, butyl acrylate-acrylic acid and octyl acrylate-acrylic acid copolymers.

A method for preparing microcapsules by polymerizing urea and formaldehyde in the presence of an anionic polyelectrolyte and an ammonium salt of an acid as disclosed in U.S. Pat. Nos. 4,251,386 and 4,356,109 is incorporated by reference. Examples of the anionic polyelectrolytes include copolymers of acrylic acid. Examples include copolymers of alkyl acrylates and acrylic acid including methyl acrylate-acrylic acid, ethyl acrylate-acrylic acid, butyl acrylate-acrylic acid and octyl acrylate-acrylic acid copolymers.

The microcapsule and process for forming a microcapsule of the invention provides for in situ polymerization of pre-polymers within the forming capsule to form a microencapsulated adhesive. The pre-polymers are essentially a pre-adhesive. The pre-polymer is an addition polymerizable pre-polymer which can include monomers and oligomers. "Addition polymerizable" is used in a non-restrictive sense to describe the joining together of many smaller molecular units to form a large molecule or polymer. This can encompass addition via cations, anions, free radicals, chain reaction polymerization or step reaction polymerization. The addition polymerizable pre-polymer can be selected from the group consisting of alkyl acrylate, aralkyl acrylate, cycloalkyl acrylate, alkoxy acrylate, cycloalkoxy acrylate, bicycloalkyl acrylate, alkoxy (alkoxy)n acrylate, alkyl methacrylate, aralkyl methacrylate, cycloalkyl methacrylate, alkoxy methacrylate, bicycloalkyl methacrylate, cycloalkoxy methacrylate, and alkoxy (alkoxy)n methacrylate. The alkyl moieties should be selected preferably of 1 to 16 carbons, the cycloalkyl moieties from 4 to 8 carbons, and n is an integer from 1 to 6.

More particularly the addition polymerizable pre-polymer whose homopolymer has a Tg of less than about 0C, a flash point of at least 75° C., and a boiling point of at least 175° C., is selected from n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, isodecyl acrylate, 2-ethoxyethyl methacrylate; butyl diglycol methacrylate; tetrahydrofurfuryl acrylate; 2-phenoxyethyl acrylate, isohexyl acrylate; tridecyl acrylate; tridecyl methacrylate; ethoxylated nonyl phenol acrylate and the like and mixtures thereof.

Optionally, in forming the microcapsule containing adhesive, in addition to the polymerizable prepolymer, a terpene resin can be included. Terpene resins for purposes of the invention include wood rosin resins, esters of gum rosin, styrenated terpene and terpene phenolic resins. Terpene resins function as tackifiers. Terpene resins include wood rosin resins as these typically comprise terpene or terpene phenol resins (CAS #259094-71-8). Examples of terpene resins include modified terpene resins, such as Sylvares™ or Zonatac™ types (Arizona Chemical, Panama City, Fla. ), or ester-modified or polyol ester modified terpene resins such as Sylvalite™ (CAS#8050-26-8) and the like.

Optionally, in forming the microcapsule containing adhesive, the adhesive-forming core material can include a second substantially water insoluble polymerizable pre-polymer which pre-polymer is multifunctional having at least two addition polymerizable sites. These addition polymerizable sites interact with other addition polymerizable sites in the transformation of the pre-polymers to an encapsulated tacky adhesive material.

The second substantially water insoluble polymerizable pre-polymer which is multi-functional having at least two addition polymerizable sites can be selected from the group consisting of allyl methacrylate, alkene glycol dimethacrylate, alkyl dimethacrylate, alkyldiol dimethacrylate, alkoxy alkanol diacrylate, trialkanol triacrylate, alkoxy(alkoxy)$_n$ alkyl triacrylate, alkoxy (alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, allyl acrylate, alkene glycol diacrylate, alkyl diacrylate, alkyldiol diacrylate, alkoxy alkanol dimethacrylate, trialkanol trimethacrylate, alkoxy (alkoxy)$_n$ alkyl trimethacrylate, alkoxy (alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl moieties are of 1 to 16 carbons, the cycloalkyl moieties are of 4 to 8 carbons, n is an integer from 1 to 6. More specifically, the second substantially water insoluble polymerizable pre-polymer having at least two addition polymerizable sites can be selected from any of allyl methacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate;

1,6 hexanediol diacrylate; 1,6 hexanediol dimethacrylate; neopentyl glycol diacrylate;

neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethyacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, and the like, and mixtures thereof.

The second substantially water insoluble polymerizable pre-polymer can have at least three different mechanisms for forming a tackified adhesive with the first pre-polymer. The second polymerizable pre-polymer can have two reactive sites or polyfunctional sites for reacting with the fist pre-polymer. Alternatively, the second pre-polymer can be selected to have polar groups such as oxygen, amine, ether, ester, alcohol, ketone, hydroxy, epoxy, carboxylic acid, or aryl acid, without limitation, for purposes of hydrogen bonding with other polar groups of the forming adhesive polymer. Yet a third alternative is to select the second pre-polymer such that it stericly entangles or hinders the movement of opposing chains of the adhesive being formed.

By "substantially water insoluble" is meant that the material has a solubility in water by weight of less than about 2% more preferably less than 1%.

The second substantially water insoluble polymerizable pre-polymer having polar groups can be selected from the group consisting of alkoxy acrylate, alkoxy methacrylate, polyester acrylate, polyester methacrylate, alkoxy(alkoxy)$_n$ alkyl acrylate, alkoxy(alkoxy)$_n$ alkyl methacrylate, acrylalkoxy phthalic acid, methacrylalkoxy phthalic acid, glycidyl methacrylate, glycidyl acrylate, cycloalkoxy acrylate, cycloalkoxy methacrylate, and aroxy acrylate, aroxy methacrylate wherein said alkyl moieties are from one to sixteen carbons, wherein the cycloalkyl moieties are from four to eight carbons, wherein n is an integer from one to six.

More particularly the adhesive-forming core material car include in addition a second substantially water insoluble polymerizable pre-polymer which is substantially water insoluble and having polar groups for purposes of hydrogen bonding with other polar groups of the respective pre-polymers. Specific examples of the second substantially water insoluble polymerizable pre-polymer includes materials selected from the group consisting of butyl diethyleneglycol methacrylate, 2-methoxyethyl acrylate; 2-ethoxyethyl methacrylate; butyl diglycol methacrylate; t-butylaminoethyl methacrylate; 2-(2-oxoimidazolidin-1-yl-ethyl) methacrylate; tetrahydrofurfuryl methacrylate; tetrahydrofurfuryl acrylate; 2-phenoxyethyl acrylate; 2-phenoxyethyl methacrylate; glycidyl methacrylate; ethoxylated nonyl phenol acrylate; ethoxylated hydroxyethyl methacrylate; alkoxylated tetrahydrofurfuryl acrylate; ethoxylated nonyl phenol methacrylate; alkoxylated nonyl phenol acrylate; caprolactone acrylate; 2-acryloxy ethoxy-o-phthalic acid; 2-acryloxy-1-methylethoxy-o-phthalic acid and 2 -acryloxy-1-methylethoxy-o-dihydro (3,6)-phthalic acid.

As stated above, yet another alternative for the second substantially water insoluble polymerizable pre-polymer for interacting with the polymerizable addition sites of the first pre-polymer to form the adhesive are pre-polymers that result in steric entanglement or that stericly hinder the movement of opposing chains of the forming adhesive polymer.

The adhesive-forming core material of the microcapsule thus can include in addition a second substantially water insoluble polymerizable pre-polymer which provide the above-referenced steric hinderance. Such second water insoluble pre-polymer for example can be selected from the group consisting of alkyl acrylate of greater than 14 carbons, alkyl methacrylate of greater than 14 carbons, cycloalkyl acrylates, cycloalkyl methacrylate, multicyclic alkyl acrylate, multicyclic alkyl methacrylate, aralkyl acrylate, aralkyl methacrylate, cycloalkoxy acrylate, cycloalkoxy methacrylate, wherein the alkyl moieties are of at least 14 carbons, and wherein the cycloalkyl moieties are of at least 6 carbons.

The second substantially water insoluble polymerizable pre-polymer which stericly hinders the first water insoluble polymerizable pre-polymer, can be selected from specific material such as stearyl acrylate; stearyl methacrylate; acrylate C18–22, dicyclopentenyloxyethyl methacrylate; dicyclopentyl oxyethyl methacrylate; isobornyl methacrylate; isobornyl acrylate; benzyl acrylate; benzyl methacrylate; cyclohexyl acrylate; cyclohexyl methacrylate; and cetyl acrylate. Some of the materials identified as participating in hydrogen bonding earlier, such as tetrahydrofurfuryl methacrylate and acrylate, and also for example, 2-phenoxy ethyl acrylate and methacrylate can also function as stericly hindering pre-polymers.

In forming the microcapsule containing adhesive, an aqueous mixture is formed of the hydrophillic wall-forming material. To the aqueous mixture, a substantially water insoluble adhesive-forming pre-polymer (or monomer) core material is added along with a free radical initiator. The adhesive-forming pre-polymer material is selected to have a Tg less than about 0° C., a flash point of at least 75° C., and a boiling point of at least 175° C. The solvent for the adhesive-forming pre-polymer is selected to be able to solvate the monomer component and is typically a water insoluble plasticizer or hydrocarbon material or resin.

As an alternative, the present invention comprises a method for forming a pressure sensitive or flowable adhesive in situ in a microcapsule by providing an aqueous mixture of a polyacrylic wall material blended with partially methylated methylol melamine resin. The acrylic wall material preferably is selected from alkyl acrylate-acrylic acid copolymer and polyacrylic acid, together with partially methylated methylol melamine resin.

To the aqueous mixture is added a substantially water insoluble core material and free radical initiator, the core material comprising an adhesive forming pre-polymer having a Tg of less than about 0° C., a flash point of at least 75° C., and a boiling point of at least 175° C., and optionally a second pre-polymer such as a diacrylate, dimethyacrylate, or polyester acrylate for providing interaction or cross-linking between polymer chains.

High shear agitation is provided to the aqueous mixture to achieve a droplet size of less than about 250μ, preferably less than 100μ, and more preferably less than 50μ. In certain applications droplet sizes of around 10μ may be preferable. The mixture is stirred at a first temperature to effect capsule wall formation. It should be readily understood by those skilled in the art that this may be accompanied by a pH shift with wall materials such as gelatin to promote the phase separation in the wall formation step, as taught in patents such as U.S. Pat. Nos. 2,800,457 and 2,800,458 is incorporated by reference. This mixture is heated to a second temperature to polymerize the first and second monomers of the core material to form an adhesive in situ in the formed capsules.

With gradual heating to a first temperature, capsule wall forms around the combination of monomers (or pre-polymer), additives and free radical initiator. Continued agitation of the emulsion while raising the temperature to a second temperature causes the adhesive monomer to polymerize.

The adhesive can be assembled from a single pre-polymer or a blend of such pre-polymers. For purposes of the invention, the Tg of less than 0° C., flashpoint of at least 75° C., and boiling point of at least 175° C. of the homopolymers was found to be an effective, yet convenient, selection tool for the first pre-polymer.

The free radical source such as the azo initiator or organic peroxide is generally used in an amount of up to 1.5% by weight.

The flash point of the homopolymer of the first prepolymer should be 75° C. or greater and is measured by standard tests. For purposes hereof, Flash Point was determined by Tag Closed Cup ASTM D56.

The boiling point is understood as measured at 1 atmosphere. For purposes of the invention, it should be understood that materials which are relatively stable to 175° C. but then above such temperature decompose, sublime or otherwise do not have a distinct boiling point would nonetheless be considered as within the invention in terms of having a boiling point of at least 175° C. The boiling point parameter is merely a selection means for identifying functional homopolymers. The stability up to 175° C. is important as opposed to whether the material thereafter decomposes before some temperature point above 175° C. is reached.

TABLE 1

| Material | TG (° C.) | BP (MmHg) | FP |
| --- | --- | --- | --- |
| Isobutyl acrylate | −40 | 139° C. | 30° C. |
| n-propyl acrylate | −52 | 44° C. | — |
| n-butyl acrylate | −54 | 148° C. | 47° C. |
| ethyl acrylate | −22 | 100° C. | 16° C. |
| isopropyl acrylate | −5 | 52° C. | — |
| 2-ethylhexyl acrylate | −70 | >213° C. | 92° C. |
| Lauryl methacrylate | −65 | 292° C. | 110° C. |
| Isodecyl acrylate | −60 | >175° C. | 93° C. |
| Isooctyl acrylate | −54 | >175° C. | 81° C. |
| Tridecyl methacrylate | −46 | >175° C. | 150° C. |
| Tridecyl acrylate | −55 | >175° C. | 132° C. |
| Lauryl acrylate | −30 | >175° C. | 93° C. |
| 2-ethylhexyl methacrylate | −10 | >175° C. | 92° C. |
| Caprolatone acrylate | −53 | 226° C. | 136° C. |

The first pre-polymer can constitute up to about 100% by weight of the adhesive or capsule core material. Preferably the first pre-polymer constitutes around 40% to 75% of the capsule core by weight.

The second pre-polymer can constitute up to about 50% preferably from about 1% to 25% by weight of the capsule core.

The solvent can constitute from about 0 to 40% preferably about 0 to 15% of the capsule core by weight.

Other optional capsule core materials can include modifiers, rheology aids, tackifiers, rubberized particles, lubricants and plasticizers. Typically the adhesive forming core material does not contain a coloring agent or toner. If desired, though not preferred, a coloring agent could be included in an amount up to 0.05 parts by weight per 100 parts by weight of the resin contained in the core material.

The formed capsules can be applied "as is" as a coating or formed into a more enhanced coating by dispersion in a suitable aqueous vehicle together with binder such as polyvinyl alcohol or latex. The coating of microencapsulated adhesive can be applied, for example, to at least part of one surface of a substrate. The coating upon drying is nontacky. Upon rupture of the capsules by application of pressure or other means, the adhesive in the capsules is released yielding a tacky adhesive laden surface.

EXAMPLE 1

A first mixture was prepared by combining 208 grams of water and 5 grams of alkyl acrylate-acrylic acid copolymer. This first mixture was adjusted to pH 5.0 using acetic acid.

The capsule core material which comprises the adhesive was prepared by combining 1.25 g of a free radical initiator (2,2'-azobis (methylbutyronitrile) (Vazo 67) with 187.5 g of 2-ethylhexyl acrylate monomer, and 61.25g of a hydrocarbon resin solvent. 250 grams of this capsule core material was combined with the first mixture at a temperature of 25° C. to form an emulsion.

The ingredients to form the capsule wall material were prepared as follows: 9 grams of a corresponding capsule wall material copolymer pre-polymer (butylacrylate-acrylic acid copolymer) and 90.0 grams of water were combined and adjusted to pH 5.0. To this mixture was added 28 grams of a partially methylated methylol melamine resin solution ("Cymel 385", 80% solids, Cytec). This mixture was added to the above-described emulsion with stirring at a temperature of 25° C. High speed blending was used to achieve a particle size of 6.5 microns. The temperature of the mixture was gradually increased to 65° C. and was maintained at this temperature overnight with continuous stirring to initiate and complete encapsulation.

The temperature of the reaction mixture was increased to 90° C. and maintained at that temperature for 16 hours in order to polymerize the adhesive pre-polymers. The resulting microencapsulated polymerized adhesive was in the form of a slurry. This capsule slurry is applied as a coating onto a substrate such as paper and dried. The paper surface is non-tacky. The surface becomes tacky after the capsules are ruptured such as by application of pressure.

To form the acrylic acid-alkyl acrylate copolymer capsule wall, the alkyl group for the copolymer can be selected from ethyl, propyl, butyl, amyl, hexyl, cyclohexyl, 2-ethylhexyl or other alkyl groups having from one to about sixteen carbons, preferably one to eight carbons.

Particle size was measured after emulsification and after completion of the encapsulation process. Particle size measurements were made in an Accusizer Model 780 particle size instrument (manufactured by Particle Sizing Systems) and visually by means of a microscope.

EXAMPLE 2

Using the microcapsule formation process according to Example 1, the 250 g of adhesive-forming core material were substituted to include a difunctional pre-polymer for cross-linking with the first pre-polymer.

| Capsule core material | |
| --- | --- |
| 187.25 g | 2-ethylhexyl acrylate |
| 62.5 g | polybutene resin |
| 0.25 g | diethylene glycol dimethacrylate |
| 1.25 g | azo initiator (Vazo ™ 67) |

Capsule formation was carried out over 8 hours at a temperature of 65° C.

Subsequently heating was continued with stirring at 90° C. for 16 hours to effect adhesive formation in situ. The resultant capsules formed dry coatings which were tacky upon rupture.

EXAMPLE 3

Using the microcapsule formation process of Example 1, the 250 g of adhesive-forming core material were substituted to include a pre-polymer for hydrogen bonding with polar groups for forming the adhesive.

| Capsule core material | |
|---|---|
| 210 g | 2-ethylhexyl acrylate |
| 2.5 g | caprolactone acrylate |
| 37.5 g | polybutene resin |
| 1.4 g | azo initiator (Vazo ™ 67) |

Capsule formation was carried out over 16 hours at a temperature of 65° C.

Subsequently heating was continued with stirring at 90° C. for 16 hours to effect adhesive formation in situ. The resultant capsules formed dry coatings which were tacky upon rupture.

EXAMPLE 4

Using the microcapsule formation process according to Example 1, the 250 g of adhesive-forming core material were substituted to include a pre-polymer that stericly hinders the movement of opposing chains of the forming adhesive polymer.

| Capsule core material | |
|---|---|
| 175 g | lauryl methacrylate |
| 25 g | tetrahydrofurfuryl methacrylate |
| 50 g | polybutene resin |
| 1 g | azo initiator (Vaso ™ 67) |

Capsule formation was carried out over 16 hours at a temperature of 65° C. subsequently heating was continued with stirring at 90° C. for 16 hours to effect adhesive formation in situ. The resultant capsules formed dry coatings which were tacky upon rupture.

EXAMPLE 5

Using the microcapsule formation process according to Example 1, the 250 g of adhesive-forming core material were substituted with the following materials.

| Capsule core material | |
|---|---|
| 250 g | lauryl methacrylate |
| 1.6 g | azo initiator (Vazo ™ 67) |

Capsule formation was carried out over 8 hours at a temperature of 65° C subsequently heating was continued with stirring at 90° C. for 8 hours to effect adhesive formation in situ. The resultant capsules formed dry coatings which were tacky upon rupture.

EXAMPLE 6

Using the microcapsule formation process according to Example 1, the 250 g of adhesive-forming core material were substituted with the following materials.

| Capsule core material | |
|---|---|
| 225 g | lauryl methacrylate |
| 25 g | di-isodecyladipate |
| 1.4 g | azo initiator (Vazo ™ 67) |

Capsule formation was carried out over 8 hours at a temperature of 65° C. subsequently heating was continued with stirring at 90° C. for 8 hours to effect adhesive formation in situ. The resultant capsules formed dry coatings which were tacky upon rupture.

EXAMPLE 7

Using the microcapsule formation process according to Example 1, the 250 g of adhesive-forming core material were substituted with the following materials.

| Capsule core material | |
|---|---|
| 225 g | ethylhexylacrylate |
| 25 g | ditridecyladipate |
| 0.1 g | azo initiator (Vazo ™ 67) |

Capsule formation was carried out over 8 hours at a temperature of 65° C subsequently heating was continued with stirring at 90° C. for 8 hours to effect adhesive formation in situ. The resultant capsules formed dry coatings which were tacky upon rupture.

EXAMPLE 8

Using the microcapsule formation process according to Example 1, the 250 g of adhesive-forming core material were substituted with the following materials.

| Capsule core material | |
|---|---|
| 12.5 g | Sylvatac (wood rosin resin), RE 100NS, Arizona Chemical Company |
| 12.5 g | polybutene resin (Indopol ™ H-100) |
| 1.25 g | caprolactone acrylate |
| 223.75 g | ethylhexyl acrylate |
| 0.3 g | azo initiator (Vazo ™ 67) |

Capsule formation was carried out over 8 hours at a temperature of 65° C. subsequently heating was continued with stirring at 90° C. for 8 hours to effect adhesive formation in situ. The resultant capsules formed dry coatings which were tacky upon rupture.

EXAMPLE 9

Using the microcapsule formation process according to Example 1, the 250 g of adhesive-forming core material were substituted with the following materials.

| Capsule core material | |
|---|---|
| 25 g | Sylvares ZT 105 LT, styrenated terpene resin, Arizona Chemical Company |
| 12.5 g | polybutene resin (Indopol ™ H-100) |
| 0.25 g | diethylene glycol dimethacryate |
| 1.25 g | caprolactone acrylate |
| 211 g | ethylhexylacrylate |
| 0.9 g | azo initiator (Vazo ™ 67) |

Capsule formation was carried out over 8 hours at a temperature of 65° C subsequently heating was continued with stirring at 90° C. for 8 hours to effect adhesive formation in situ. The resultant capsules formed dry coatings which were tacky upon rupture.

EXAMPLE 10

Using the microcapsule formation process according to Example 1, the 250 g of adhesive-forming core material were substituted with the following materials.

| | Capsule core material |
|---|---|
| 62.5 g | Sylvares ZT 105 LT, styrenated terpene resin |
| 3 g | diethylene glycol dimethacrylate |
| 1.5 g | caprolactone acrylate |
| 12.5 g | polybutene resin (Indopol ™ H-100) |
| 171 g | ethylhexyl acrylate |
| 2.5 g | azo initiator (Vazo ™ 67) |

Capsule formation was carried out over 16 hours at a temperature of 65° C. subsequently heating was continued with stirring at 90° C. for 16 hours to effect adhesive formation in situ. The resultant capsules formed dry coatings which were tacky upon rupture.

EXAMPLE 11

Using the microcapsule formation process according to Example 1, the 250 g of adhesive-forming core material were substituted with the following materials.

| | Capsule core material |
|---|---|
| 25 g | Sylvares ™ ZT 105 LT, styrenated terpene resin |
| 12.5 g | polybutene resin (Indopol ™ H-100) |
| 2 g | tetrahydrofurfuryl methacrylate |
| 0.125 g | diethyleneglycol dimethacrylate |
| 210 g | lauryl methacrylate |
| 1.3 g | azo initiator (Vazo ™ 67) |

Capsule formation was carried out over 8 hours at a temperature of 65° C. subsequently heating was continued with stirring at 90° C. for 8 hours to effect adhesive formation in situ. The resultant capsules formed dry coatings which were tacky upon rupture.

EXAMPLE 12

Using the microcapsule formation process according to Example 1, the 250 g of adhesive-forming core material were substituted with the following materials.

| | Capsule core material |
|---|---|
| 12.5 g | Sylvares ™ ZT 105 LT, styrenated terpene resin |
| 12.5 g | polybutene resin (Indopol ™ H-100) |
| 0.5 g | diethyleneglycol dimethacrylate |
| 1.25 g | caprolactone acrylate |
| 223 g | ethylhexyl acrylate |
| 1.35 g | azo initiator (Vazo ™ 67) |

Capsule formation was carried out over 8 hours at a temperature of 65° C. subsequently heating was continued with stirring at 90° C. for 8 hours to effect adhesive formation in situ. The resultant capsules formed dry coatings which were tacky upon rupture.

EXAMPLE 13

Using the microcapsule formation process according to Example 1, the 250 g of adhesive-forming core material were so.

| | |
|---|---|
| 100 g | Sylvarez ™ ZT 105 LT, styrenated terpene resin |
| 5 g | polybutene resin (Indopol ™ H100) |
| 0.25 g | diethyleneglycol dimethacrylate |
| 2 g | tetrahydrofurfurol |
| 1.1 g | azo initiator (Vazo ™ 67) |
| 142 g | lauryl methacrylate |

EXAMPLES 14 TO 17

Using the microcapsule formation process according to Example 1, various combinations of pre-polymers were assembled as the adhesive-forming core material.

TABLE 2

| Adhesive Constituents | | Example 14 | Example 15 | Example 16 | Example 17 |
|---|---|---|---|---|---|
| Pre-polymer | 2-Ethylhexyl Acrylate (%) | | 18.61 | 59.24 | 74.49 |
| | Lauryl Methacrylate (%) | 64.45 | 55.84 | 19.75 | |
| Solvent | Indopol ™ H-40 Polybutene Resin (%) | 25 | 15 | | 15 |
| Solvent | Indopol ™ H-100 Polybutene Resin (%) | | | 15 | |
| Additives | Sylvares ™ ZT105LT Tackifier (%) (modified terpene resin) | 5 | | 0.125 | 0.5 |
| Additives | Wingtack ™ 10 Hydrocarbon Resin Tackifier (%) | | 0.5 | 0.375 | |
| Cross-Linking Pre-Polymer | 1,6 Hexanediol Dimethacrylate (%) | 0.05 | | | 0.01 |
| Cross-Linking Pre-Polymer | Diethyleneglycol Dimethacrylate (%) | | 0.05 | 0.01 | |
| Steric Pre-Polymer | Isobornyl Methacrylate (%) | 0.5 | 5 | | |
| | 2-Phenoxyethyl Acrylate (%) | | | 5 | 5 |
| Hydrogen-Bonding Pre-Polymer | Butyl Diethyleneglycol Methacrylate (%) | 5 | 5 | | 5 |
| | Tetrahydrofurfuryl Methacrylate (%) | | | 0.5 | |
| Azo Initiator | Vazo ™ -67 Initiator (% of monomer) | 0.65 | 0.65 | 0.75 | 0.75 |
| First Temperature | Reaction Time at 65° C. | 8 hr. | 16 hr. | 16 hr. | 16 hr. |
| Second Temperature | Reaction Time at 90° C. | 16 hr. | 16 hr. | 16 hr. | 16 hr. |
| | Tensile Bond Strength (paper)--#/1 sq. in. | 23.4 | 22 | 24.4 | 23.8 |
| | Tensile Bond Strength (metal)--#/1 sq. in. | 14.6 | 14.5 | 11 | 10.4 |

(Percentages listed refer to percent of internal phase, except as otherwise indicated.)

EXAMPLE 18

Gelatin—gum arabic capsules 25 g of gelatin are added to 200 g of distilled water. The pH is adjusted to about 6.5. A similar separate solution of gum arabic is also prepared. 160 grams of internal phase adhesive forming pre-polymer, solvent and dissolved azo initiator are dissolved into about 182 grams of an 11% solution of the gelatin. This internal phase solution is added to the gelatin while stirring in a high speed blender to achieve a droplet size around 50$\mu$. The gum arabic solution is added to the emulsion. Coacervation is carried out at 55° C. In addition, the pH is lowered with acetic acid to promote the phase separation. The capsules can be hardened by addition of glutaraldehyde. After about 8 hours, the temperature is raised to 90° C. to form the adhesive within the formed microcapsules.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

I claim:

1. A microencapsulated adhesive composition wherein an adhesive is formed in situ in microcapsules, the microencapsulated adhesive composition comprising:

a substantially water insoluble adhesive-forming core material, said core material comprising at least a first addition polymerizable pre-polymer material whose homopolymer has a Tg of less than about 0° C., a flash point of at least 75° C., and a boiling point of at least 175° C. at one atmosphere, and including in addition a second substantially water insoluble polymerizable pre-polymer which is multi-functional having at least two addition at least two addition polymerizable sites, selected from the group consisting of allyl methacrylate, alkene glycol dimethacrylate, alkyl dimethacrylate, alkyldiol dimethacrylate, alkoxy alkanol diacrylate, trialkanol triacrylate, alkoxy (alkoxy)$_n$ alkyl triacrylate, alkoxy (alkoxy) alkyl dimethacrylate, aralkyl dimethacrylate, cycloalkyl dimethacrylate, alkoxy dimethacrylate, bicycloalkyl dimethacrylate, cycloalkoxy dimethacrylate, allyl acrylate, alkene glycol diacrylate, alkyl diacrylate, alkyldiol diacrylate, alkoxy alkanol dimethacrylate, trialkanol trimethacrylate, alkoxy (alkoxy)$_n$ alkyl trimethacrylate, alkoxy (alkoxy)$_n$ alkyl diacrylate, aralkyl diacrylate, cycloalkyl diacrylate, alkoxy diacrylate, bicycloalkyl diacrylate, and cycloalkoxy diacrylate;

wherein the alkyl moieties are of 1 to 16 carbons;
   wherein the cycloalkyl moieties are of 4 to 8 carbons; and
   wherein n is an integer from 1 to 6; and, a catalytically effective amount of a substantially water insoluble free radical initiator, said free radical initiator having a half-life of at least 1 hour at 25° C., said free radical initiator being soluble in the polymerizable pre-polymer material and solvent, microcapsules obtained by providing an aqueous mixture containing a colloidal dispersion of wall-forming material for forming microcapsules, wherein high shear agitation is applied to the aqueous mixture to achieve a particle size of the core material of less than about 250 $\mu$, wherein stirring at a first temperature effects microcapsule wall formation of the microcapsule wall-forming material, and wherein heating to a second temperature polymerizes the pre-polymer of the core material to form an adhesive in situ in the formed microcapsules.

2. A microencapsulated adhesive composition wherein an adhesive is formed in situ in microcapsules, the microencapsulated adhesive composition comprising:

a substantially water insoluble adhesive-forming core material, said core material comprising at least a first addition polymerizable pre-polymer material whose homopolymer has a Tg of less than about 0° C., a flash point of at least 75° C., and a boiling point of at least 175° C. at one atmosphere, and including in addition a second substantially water insoluble polymerizable pre-polymer selected from the group consisting of allyl methacrylate, triethylene glycol dimethacrylate, ethylene glycol dimethacrylate, tetraethylene glycol dimethacrylate, polyethylene glycol dimethacrylate, 1,3 butylene glycol diacrylate, 1,4-butanediol diacrylate, 1,4 butanediol dimethacrylate, diethylene glycol diacrylate, diethylene glycol dimethacrylate, 1,6 hexanediol diacrylate, 1,6 hexanediol dimethacrylate, neopentyl glycol diacrylate, neopentyl glycol dimethacrylate, polyethylene glycol diacrylate, tetraethylene glycol diacrylate, triethylene glycol diacrylate, 1,3 butylene glycol dimethacrylate, tripropylene glycol diacrylate, dipropylene glycol diacrylate, alkoxylated hexanediol diacrylate, ethoxylated bisphenol dimethacrylate, alkoxylated cyclohexane dimethanol diacrylate, propoxylated neopentyl glycol diacrylate, trimethylolpropane trimethacrylate, trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, and mixtures thereof; and a catalytically effective amount of a substantially water insoluble free radical initiator, said free radical initiator having a half-life of at least 1 hour at 25° C., said free radical initiator being soluble in the polymerizable pre-polymer material and solvent, microcapsules obtained by providing an aqueous mixture containing a colloidal dispersion of wall-forming material for forming microcapsules, wherein high shear agitation is applied to the aqueous mixture to achieve a particle size of the core material of less than about 250 $\mu$, wherein stirring at a first temperature effects microcapsule wall formation of the microcapsule wall-forming material, and wherein heating to a second temperature polymerizes the pre-polymer of the core material to form an adhesive in situ in the formed microcapsules.

3. A microencapsulated adhesive composition wherein an adhesive is formed in situ in microcapsules, the microencapsulated adhesive composition comprising:

a substantially water insoluble adhesive-forming core material, said core material comprising at least a first addition polymerizable pre-polymer material whose homopolymer has a Tg of less than about 0° C., a flash point of at least 75° C., and a boiling point of at least 175° C. at one atmosphere, and including in addition a second substantially water insoluble polymerizable pre-polymer having polar groups for purposes of hydrogen bonding, said second substantially water insoluble polymerizable pre-polymer selected from the group consisting of alkoxy acrylate, alkoxy methacrylate, polyester acrylate, polyester methacrylate, alkoxy (alkoxy)$_n$ alkyl acrylate, alkoxy (alkoxy)$_n$ alkyl methacrylate, acrylalkoxy phthalic acid, glycidyl methacrylate, cycloalkoxy methacrylate, cycloalkoxy acrylate, aroxy acrylate, methacrylalkoxy phthalic acid, glycidyl acrylate and a catalytically effective amount of a substantially water insoluble free radical initiator, said free radical initiator having a half-life of at least 1 hour at 25° C., said free radical initiator being soluble in the polymerizable pre-polymer material and solvent, microcapsules obtained by providing an aqueous mixture containing a colloidal dispersion of wall-forming material for forming microcapsules, wherein high shear agitation is applied to the aqueous mixture to achieve a particle size of the core material of less than about 250 $\mu$, wherein stirring at a first temperature effects microcapsule wall formation of the microcapsule wall-forming material, and wherein heating to a second temperature polymerizes the pre-polymer of the core material to form an adhesive in situ in the formed microcapsules.

4. A microencapsulated adhesive composition wherein an adhesive is formed in situ in microcapsules, the microencapsulated adhesive composition comprising:

a substantially water insoluble adhesive-forming core material, said core material comprising at least a first addition polymerizable pre-polymer material whose homopolymer has a Tg of less than about 0° C., a flash point of at least 75° C., and a boiling point of at least 175° C. at one atmosphere, and including in addition a second substantially water insoluble polymerizable pre-polymer which is substantially water insoluble and having polar groups for purposes of hydrogen bonding with the first addition polymerizable pre-polymer, said second substantially water insoluble polymerizable pm-polymer selected from the group consisting of butyl diethyleneglycol methacrylate, 2-methoxyethyl acrylate, 2-ethoxyethyl methacrylate, butyl diglycol methacrylate. t-butylaminoethyl methacrylate, 2-(2-oxoimidazolidin-1-yl-ethyl) methacrylate, tetrahydrofurfuryl methacrylate, tetrahydrofurfuryl acrylate, 2-phenoxyethyl acrylate, 2-phenoxyethyl methacrylate, glycidyl methacrylate, caprolactone acrylate, ethoxylated nonyl phenol acrylate, ethoxylated hydroxyethyl methacrylate, alkoxylated tetrahydrofurfuryl acrylate, ethoxylated nonyl phenol methacrylate, alkoxylated nonyl phenol acrylate, 2-acryloxy -1- methylethoxy -o- phthalic acid, and 2-acryloxy -1- methylethoxy -o- dihydro - (3,6) - phthalic acid; and a catalytically effective amount of a substantially water insoluble free radical initiator, said free radical initiator having a half-life of at least 1 hour at 25° C., said free radical initiator being soluble in the polymerizable pre-polymer material and solvent, microcapsules obtained by providing an aqueous mixture containing a colloidal dispersion of wall-forming material for forming microcapsules, wherein high shear agitation is applied to the aqueous mixture to achieve a particle size of the core material of less than about 250 $\mu$, wherein stirring at a first temperature effects microcapsule wall formation of the microcapsule wall-forming material, and wherein heating to a second temperature polymerizes the pre-polymer of the core material to form an adhesive in situ in the formed microcapsules.

5. A method of forming an adhesive in situ in a microcapsule comprising:

providing an aqueous mixture containing a colloidal dispersion of hydrophillic wallforming material for forming microcapsules, adding a substantially water insoluble adhesive-forming core material, said core material comprising at least a first addition polymerizable pre-polymer material whose homopolymer has a Tg of less than about 0° C., a flash point of at least 75° C., and a boiling point of at least 175° C., and said adhesive-forming core material including in addition a second substantially water insoluble polymerizable pre-polymer which pre-polymer is multi-functional having at least two addition polymerizable sites, selected from the group consisting of allyl methacrylate, akene glycol dimethacrylate, alkyl dimethacrylate, alkyldiol dimethacrylate, alkoxy alkanol diacrylate, trialkanol triacrylate, alkoxy (alkoxy), alkyl triacrylate, alkoxy (alkoxy)$_n$ alkyl dimethacrylate, aralkyldimethacrylate, cycloalkyl dimethacrylate, alkoxy dimethacrylate, bicycloalkyl dimethacrylate, cycloalkoxy dimethacrylate; allyl acrylate; alkene glycol diacrylate, alkyl diacrylate, alkyldiol diacrylate, alkoxy alkanol dimethacrylate, trialkanol trimethacrylate, alkoxy (alkoxy)$_n$ alkyl methacrylate, alkoxy (alkoxy)$_n$ alkyl diacrylate, aralkyl diacrylate, cycloalkyl diacrylate, alkoxy diacrylate, bicycloalkyl diacrylate, and cycloalkoxy diacrylate;

wherein the alkyl moieties are of 1 to 16 carbons, wherein the cycloalkyl moieties are of 4 to 8 carbons, and wherein n is an integer from 1 to 6;

adding a catalytically effective amount of a substantially water insoluble free radical initiator to the aqueous mixture, said free radical initiator having a half-life of at least 1 hour at 25° C., said free radical initiator being soluble in the polymerizable pre-polymer material and solvent;

providing high shear agitation to the aqueous mixture to achieve a particle size of the core material of less than about 250 $\mu$;

stirring at a first temperature to effect microcapsule wall formation of microcapsule walk forming material; and heating to a second temperature to polymerize the pre-polymer of the core material to form an adhesive in situ in the formed microcapsules.

6. A method of forming an adhesive in situ in a microcapsule comprising:

providing an aqueous mixture containing a colloidal dispersion of hydrophillic wallforming material for forming microcapsules, adding a substantially water insoluble adhesive-forming core material, said core material comprising at least a first addition polymerizable pre-polymer material whose homopolymer has a Tg of less than about 0° C., a flash point of at least 75° C., and a boiling point of at least 175° C., and said adhesive-forming core material including in addition a second substantially water insoluble polymerizable pre-polymer selected from the group consisting of allyl methacrylate, triethylene glycol dimethacrylate, ethylene glycol dimethacrylate, tetraethylene glycol dimethacrylate, polyethylene glycol dimethacrylate, 1,3 butylene glycol diacrylate, 1,4-butanediol diacrylate, 1,4 butanediol dimethacrylate, diethylene glycol diacrylate, diethylene glycol dimethacrylate, 1,6 hexanediol diacrylate, 1,6 hexanediol dimethacrylate, neopentyl glycol diacrylate, neopentyl glycol dimethacrylate, polyethylene glycol diacrylate, tetraethylene glycol diacrylate, triethylene glycol diacrylate, 1,3 butylene glycol dimethacrylate, tripropylene glycol diacrylate, dipropylene glycol diacrylate, alkoxylated hexanediol diacrylate, ethoxylated bisphenol dimethacrylate, alkoxylated cyclohexane dimethanol diacrylate, propoxylated neopentyl glycol diacrylate; and adding a catalytically effective amount of a substantially water insoluble free radical initiator to the aqueous mixture, said free radical initiator having a half-life of at least 1 hour at 25° C., said free radical initiator being soluble in the polymerizable pre-polymer material and solvent;

providing high shear agitation to the aqueous mixture to achieve a particle size of the core material of less than about 250 $\mu$;

stirring at a first temperature to effect microcapsule wall formation of microcapsule wall-forming material; and heating to a second temperature to polymerize the pre-polymer of the core material to form an adhesive in situ in the formed microcapsules.

7. A method of forming an adhesive in situ in a microcapsule comprising:

providing an aqueous mixture containing a colloidal dispersion of hydrophillic wallforming material for forming microcapsules, adding a substantially water insoluble adhesive-forming core material, said core material comprising at least a first addition polymerizable pre-polymer material whose homopolymer has a Tg of less than about 0° C., a flash point of at least 75° C., and a boiling point of at least 175° C., and said adhesive-forming core material including in addition a second substantially water insoluble polymerizable pre-polymer having polar groups for purposes of hydrogen bonding, said second substantially water insoluble polymerizable pre-polymer selected from the group consisting of alkoxy acrylate, alkoxy methacrylate, polyester acrylate, polyester methacrylate, alkoxy (alkoxy)$_n$ alkyl acrylate, alkoxy (alkoxy)$_n$ alkyl methacrylate, acrylalkoxy phthalic acid, glycidyl methacrylate, cycloalkoxy methacrylate, cycloalkoxy acrylate, aroxy acrylate, methacrylalkoxy phthalic acid, glycidyl acrylate and aroxy methacrylate, wherein said alkyl moieties are from one to sixteen carbons, wherein n is an integer from one to six; and adding a catalytically effective amount of a substantially water insoluble free radical initiator to the aqueous mixture, said free radical initiator having a half-life of at least 1 hour at 25° C., said free radical initiator being soluble in the polymerizable pre-polymer material and solvent;

providing high shear agitation to the aqueous mixture to achieve a particle size of the core material of less than about 250 $\mu$;

stirring at a first temperature to effect microcapsule wall formation of microcapsule wall-forming material; and heating to a second temperature to polymerize the pre-polymer of the core material to form an adhesive in situ in the formed microcapsules.

8. A method of forming an adhesive in situ in a microcapsule comprising:

providing an aqueous mixture containing a colloidal dispersion of hydrophillic wallforming material for forming microcapsules, adding a substantially water insoluble adhesive-forming core material, said core material comprising at least a first addition polymerizable pre-polymer material whose homopolymer has a Tg of less than about 0° C., a flash point of at least 75° C., and a boiling point of at least 175° C., and said adhesive-forming core material including in addition a second substantially water insoluble polymerizable pre-polymer which is substantially water insoluble and having polar groups for purposes of hydrogen bonding with the first addition polymerizable pre-polymer, said second substantially water insoluble polymerizable pre-polymer selected from the group consisting of butyl diethyleneglycol methacrylate, 2-methoxyethyl acrylate, 2-ethoxyethyl methacrylate, butyl diglycol methacrylate, t-butylaminoethyl methacrylate, 2-(2-oxoimidazolidin-1-yl ethyl) methacrylate, tetrahydrofurfuryl methacrylate, tetrahydrofurfuryl acrylate, 2-phenoxyethyl acrylate, 2-phenoxyethyl methacrylate, glycidyl methacrylate, caprolactone acrylate; ethoxylated nonyl phenol acrylate, ethoxylated hydroxyethyl methacrylate, alkoxylated tetrahydrofurfuryl acrylate, ethoxylated nonyl phenol methacrylate, alkoxylated nonyl phenol acrylate, 2-acryloxy--1- methylethoxy -o- phthalic acid, and 2- acryloxy -1- methylethoxy -o- dihydro - (3,6) - phthalic acid; and adding a catalytically effective amount of a substantially water insoluble free radical initiator to the aqueous mixture, said free radical initiator having a half-life of at east 1 hour at 25° C., said free radical initiator being soluble in the polymerizable pre-polymer material and solvent;

providing high shear agitation to the aqueous mixture to achieve a particle size of the core material of less than about 250 $\mu$;

stirring at a first temperature to effect microcapsule wall formation of microcapsule wall-forming material; and heating to a second temperature to polymerize the pre-polymer of the core material to form an adhesive in situ in the formed microcapsules.

* * * * *